(12) United States Patent
Wingen

(10) Patent No.: US 6,895,518 B2
(45) Date of Patent: May 17, 2005

(54) POWER AND FREQUENCY ADJUSTABLE UART DEVICE

(75) Inventor: Neal T. Wingen, Algonquin, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 670 days.

(21) Appl. No.: 09/870,918

(22) Filed: May 31, 2001

(65) Prior Publication Data

US 2002/0184543 A1 Dec. 5, 2002

(51) Int. Cl.$^7$ ................................. G06F 1/32

(52) U.S. Cl. ................. 713/320; 713/300; 713/322; 713/323; 327/113; 327/115; 375/219; 375/220

(58) Field of Search ............... 713/300, 320, 713/322, 323; 327/113, 115; 375/219, 220

(56) References Cited

U.S. PATENT DOCUMENTS

| | | | | |
|---|---|---|---|---|
| 3,855,617 A | * | 12/1974 | Jankowski et al. | 360/32 |
| 4,949,333 A | * | 8/1990 | Gulick et al. | 370/282 |
| 5,511,209 A | * | 4/1996 | Mensch, Jr. | 713/500 |
| 5,649,122 A | * | 7/1997 | Wegner et al. | 710/105 |
| 5,661,751 A | * | 8/1997 | Johnson | 375/219 |
| 5,832,207 A | | 11/1998 | Little et al. | |
| 5,903,601 A | * | 5/1999 | Elnashar et al. | 375/220 |
| 5,923,705 A | * | 7/1999 | Willkie et al. | 375/220 |
| 6,198,820 B1 | * | 3/2001 | Tetsushi | 379/413 |
| 6,301,297 B1 | * | 10/2001 | Russo | 375/222 |
| 6,529,548 B1 | * | 3/2003 | Aoki et al. | 375/224 |
| 2001/0034246 A1 | * | 10/2001 | Hutchison et al. | 455/557 |

OTHER PUBLICATIONS

IBM TDB vol. No. 38, issue 8, p. 185–186; Title:" Universal Asynchronous Receiver–Transmitter Chip With Switchable Clock Rate", Aug. 1, 1995.*

* cited by examiner

Primary Examiner—A. Elamin
Assistant Examiner—Nitin C. Patel
(74) Attorney, Agent, or Firm—Peter Zawilski

(57) ABSTRACT

The present invention embodiment comprises an arrangement of integrated circuits with a UART device that is configurable to operate in a power-reduced mode while the clock frequency of serial data communication remains constant. In one example embodiment, an arrangement of a plurality of integrated circuit devices includes a first integrated circuit device driven by a first clock signal at a first clock rate. The arrangement contains a parallel data bus coupled to communicate with the first integrated circuit device in response to the first clock signal. The arrangement also includes a universal asynchronous receiver/transmitter (UART) chip with a serial communication circuit adapted to communicate serial data at a second rate defined by a second clock signal. The UART chip also encompasses a parallel bus interface circuit responsive to the first clock signal and adapted to pass data between the parallel data bus and the serial communication circuit. The UART chip also houses a data-storage-register circuit adapted to output status data to the parallel data bus, the status data being indicative of states of at least one of the serial communication circuit and the parallel bus interface circuit. The arrangement of integrated circuit devices further includes a clock control circuit adapted to reduce the first clock rate in response to a clock control signal. By reducing the first clock rate, the UART chip is configured to operate in a power-reduced mode while the serial communication circuit concurrently communicates serial data at the second rate.

10 Claims, 2 Drawing Sheets

POWER AND FREQUENCY ADJUSTABLE UART DEVICE

FIELD OF THE INVENTION

The present device relates generally to data communications circuits and, in particular, to a universal asynchronous receiver/transmitter (UART), which is operable in power reduced mode for use with a various CPUs and peripherals.

BACKGROUND OF THE INVENTION

Most digital circuits process data in parallel to provide more efficient processing. Many digital devices also use a serial port for bringing data to and from the device from a remote site, often coupled to a relay station via a telephone or LAN line. The universal asynchronous receiver/transmitter (UART) is such a digital device that performs parallel-to-serial conversion of digital data. A UART communicates between parallel and serial forms by converting received data between parallel I/O devices, such as a local CPU, and serial I/O devices, such as POTS modems or other transmission lines. Most traditional UART devices can be programmed to operate at a selected baud rate, and the newer generation UARTs handle the communication more efficiently, to a great extent due to larger FIFO depths and improved flow control (fewer retries required and waits for the internal FIFO to fill or empty).

UART devices typically have a timing circuit driven by a clock signal provided by an external circuit. The timing circuit is used to set the baud rate of the serial communications port and is also the timing source for the internal logic of the UART device. The baud rate is typically selected based on requirements for communicating through the serial port to the serial I/O device. The timing circuit can be implemented using a divide-by-N circuit to provide the clock frequency used to define the baud rate for the serial communications. In applications where performance and power demands change "on the fly," the clock frequency of the UART device is adjusted in real time. However, in some applications, adjusting the clock frequency in real time can result in a loss of data which can completely disrupt serial communications may be disrupted.

SUMMARY OF THE INVENTION

Various aspects of the present invention are directed to configuring a UART device to operate at a power-reduced mode while serial data communication continues at a constant rate. The present invention is exemplified in a number of implementations and applications, some of which are summarized below.

According to an example embodiment of the present invention, an arrangement of a plurality of integrated circuit devices includes a first integrated circuit device driven by a first clock signal at a first clock rate. The arrangement includes a parallel data bus coupled to communicate with the first integrated circuit device in response to the first clock signal. The arrangement also includes a universal asynchronous receiver/transmitter (UART) chip having a serial communication circuit adapted to communicate serial data at a second rate defined by a second clock signal. The UART chip also encompasses a parallel bus interface circuit responsive to the first clock signal and adapted to pass data between the parallel data bus and the serial communication circuit. The UART chip further includes a data-storage-register circuit adapted to output status data to the parallel data bus, the status data being indicative of at least one of the serial communication circuit and the parallel bus interface circuit. The arrangement of integrated circuit devices further includes a clock control circuit adapted to reduce the first clock rate in response to a clock control signal. By reducing the first clock rate, the UART chip is configured to operate in a power-reduced mode while the serial communication circuit continues to communicate serial data at the second rate.

More particular implementations of the present invention entail providing specific operating modes selected by the clock control circuit including, as examples, an ultra low power mode in which the parallel bus interface circuit is deactivated without changing the speed of serial data communication, and an enhanced performance mode in which the parallel bus interface operates at a high speed to increase processing of serial data.

The above summary is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawing, in which.

Figure 1:
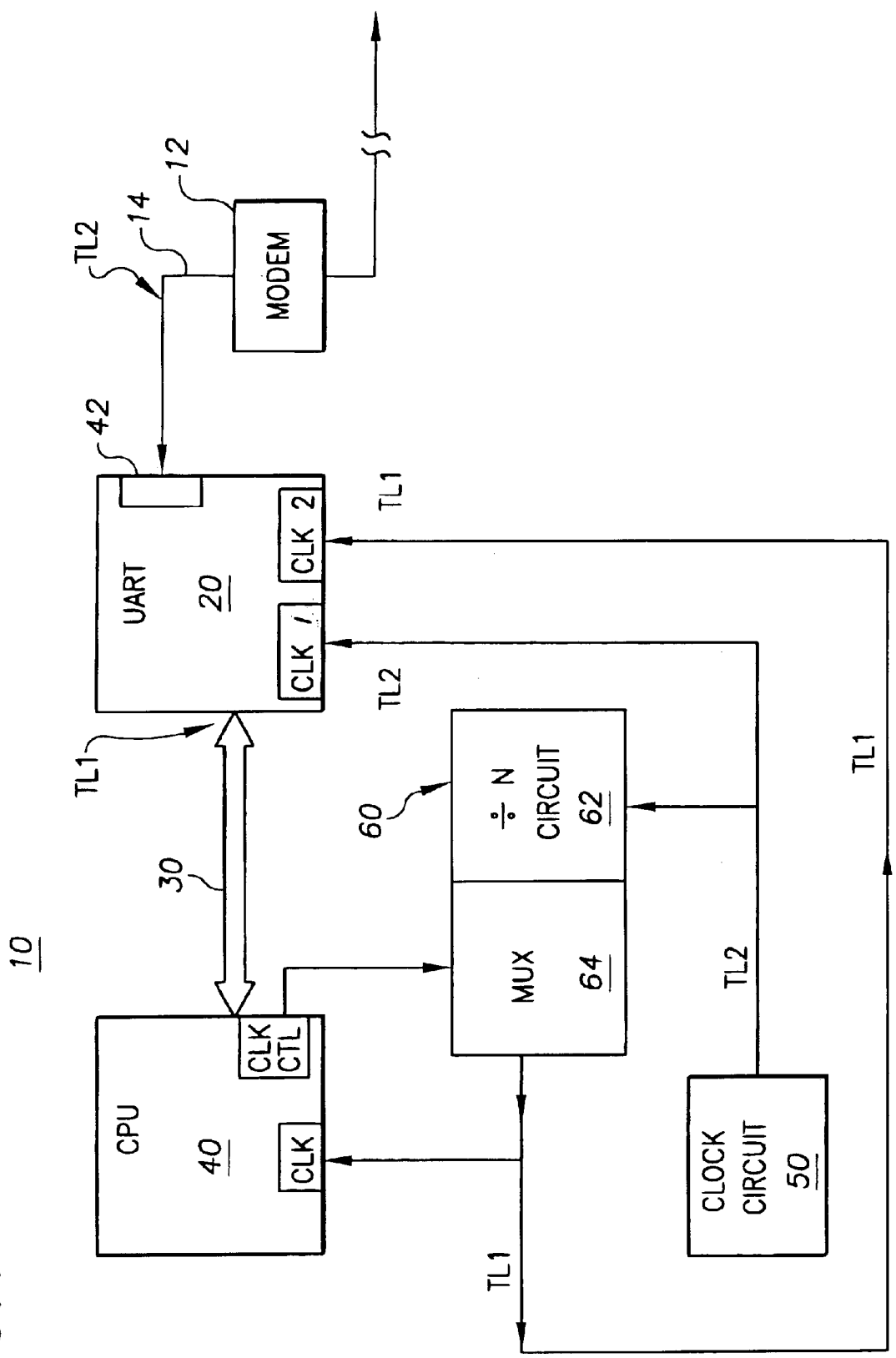
FIG. 1 is a block diagram of an arrangement of integrated circuit devices that includes a universal asynchronous receiver/transmitter (UART) chip, according to an example embodiment of the present invention.

While the invention is amenable to various modifications and alternative forms, specifics thereof have been shown by way of example in the drawing and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is generally directed to an arrangement of integrated circuits that includes a UART device that is reconfigurable to operate in a power-reduced mode while the clock frequency of serial data communication remains constant. While the present invention is not necessarily limited to such devices, an appreciation of various aspects of the invention is best gained through a discussion of various examples in such an application.

According to an example embodiment of the present invention, an arrangement of integrated circuit devices includes a UART chip that is selectably configurable to operate in various power-reduced or performance-enhanced modes. Each such operating mode provides different benefits that do not require stopping or changing the rate of serial data communication. In a particular example, the UART circuitry includes two clock inputs, with the first clock input driving the parallel bus interface circuitry of the UART and the second clock input driving the serial communications circuitry. While the clock control circuit controls both the first and second clock rates, the clock control circuit is adapted to alter the first clock rate without affecting the second clock rate. In response to a clock control signal, the clock control circuit reduces the first clock rate to provide the power-reduced UART mode or increases the first clock rate to provide the performance-enhanced UART mode.

The clock control circuit can, in addition or alternately, reduce the first clock rate to zero or asynchronously change the state of the first clock rate with respect to the second clock rate. In one more particular embodiment, the data-storage-register circuit of the UART indicates the flow condition for data passing between the parallel data bus and the serial communication circuit. The flow conditions of the UART can include: whether the FIFO registers of the serial communication circuit are full or empty; whether the registers have reached an upper or lower threshold level; or whether an error has occurred, due to, for example, the FIFO overflowing or invalid data being drawn from the FIFO.

Referring now to the figures, FIG. 1 is a block diagram of an arrangement 10 of integrated circuit devices that includes a UART device that is configured according to an example embodiment of the present invention. In this example embodiment, arrangement 10 is configured to process serial data passing through a UART chip 20 at a second clock rate versus a first clock rate of a CPU 40. In this particular example, arrangement 10 is configured to vary the first clock rate asynchronous to the second clock rate, thus not affecting the data rate of serial data 14 coming from a modem 12.

CPU 40 is configured to include a memory management unit (not shown) that provides the address, data and control signals for communicating with UART chip 20 via a parallel data bus 30. CPU 40 is responsive to a clock signal from a clock circuit 50 and provides the first clock signal at the first clock rate via a clock control circuit 60. Clock circuit 50 is the primary timing source for arrangement 10 and also provides UART chip 20 with a second clock signal at the second clock rate.

In this example embodiment, clock control circuit 60 utilizes the clock signal from clock circuit 50 and generates the first clock signal going to CPU 40 and to UART chip 20. The first clock signal originating from clock control circuit 60 is at timing level (TL)1 or the first clock rate, which may be the same as the timing level (TL)2 or the second clock rate of the second clock signal. In configuring arrangement 10 such that UART chip 20 operates in the power-reduced UART mode, the first clock rate is reduced to lessen TL1 to a rate that is less than TL2. Clock control circuit 60 processes the clock signal from clock circuit 50 through a divide-by-N circuit 62 and feeds the signal to a multiplexer 64. Multiplexer 64 receives a clock control signal from CPU 40 indicating that a new clock rate (e.g., TL1') is to be selected and TL1' now becomes the new timing level for the CPU and a portion of the UART. The changed state of the first clock rate is made asynchronous to the second clock rate with the second clock rate remaining unchanged.

In a related embodiment, implementing the ultra low power UART mode involves significantly reducing or deactivating (TL1=0) the first clock signal. TL1 is reduced to zero by multiplexer 64 in selecting a signal in response to the clock control signal received from CPU 40. In this example, CPU 40 converts to a sleep mode for a predetermined time period, but serial data 12 would continue at the second clock rate (TL2). In another example embodiment, arrangement 10 operates in an enhanced-performance mode by increasing TL1 with respect to TL2. In this example, multiplexer 64 receives a control-signal instruction from CPU 40 to select a higher clock rate from divide-by-N circuit 62 such that TL1 is greater than TL2. In this example, CPU 40 and a portion of UART chip 20 now operate at the new timing level to process data faster than at the previous level, while the rate of serial data streaming into UART chip 20 remain unchanged.

In another related embodiment, a data storage register circuit disposed in UART chip 20 is utilized to indicate the flow condition for data passing between bus 30 and a serial communication circuit receiving the data when TL1 is changed. The flow conditions of the UART include whether the FIFO registers of the serial communication circuit are full or empty, have reached an upper or lower threshold level or whether an error has occurred due, for example, to the FIFO overflowing or invalid data being drawn from the FIFO.

In one example embodiment, arrangement 10 is formed into a single integrated chip. In a related embodiment, arrangement 10 is formed of discrete components. The operation of UART chip 20 with the configurable clock frequency CLK 1 as a clock input is discussed in further detail in connection with FIG. 2.

Figure 2:
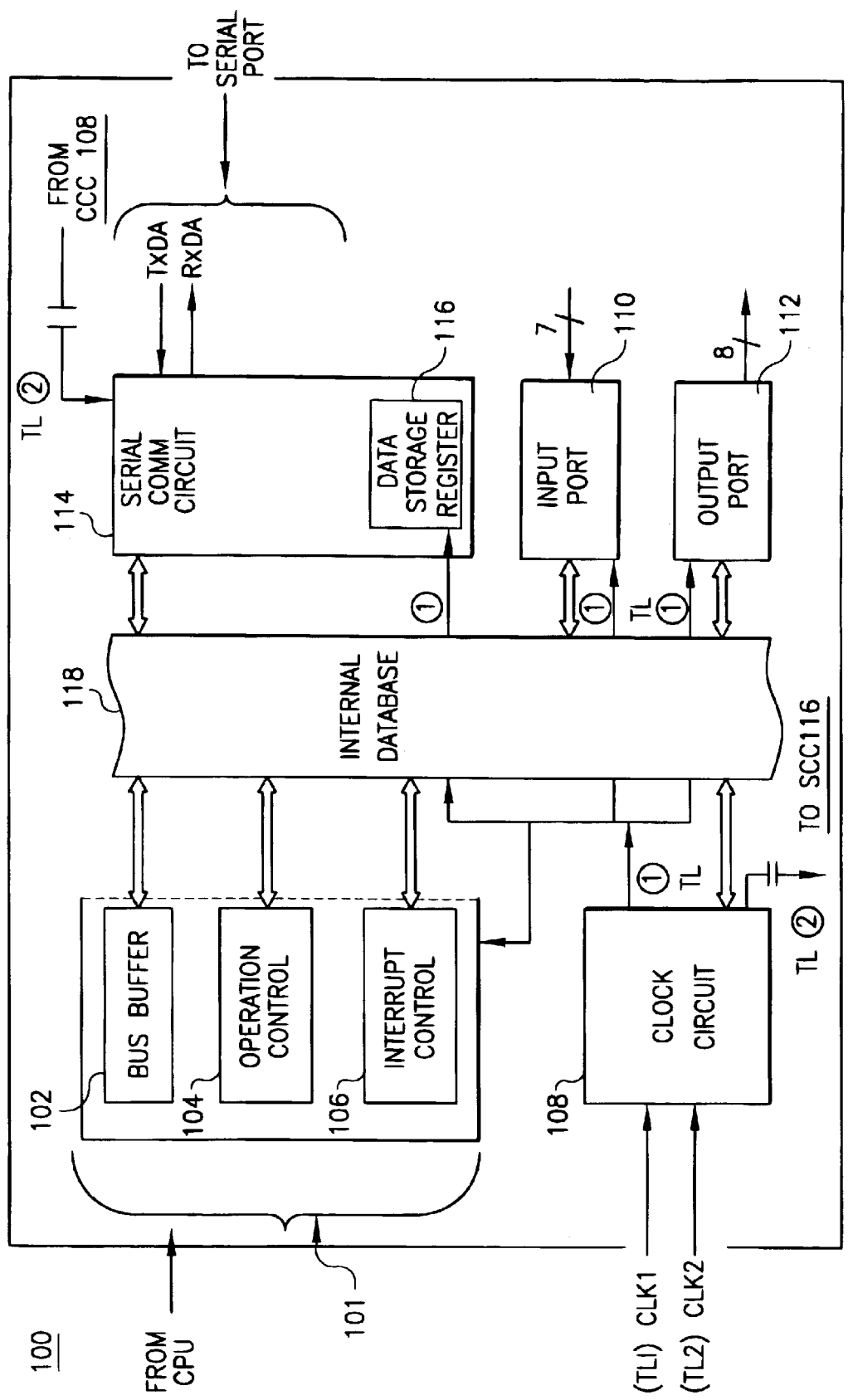
FIG. 2 is a diagram of one of the circuit blocks of FIG. 1, according to another example embodiment of the present invention.

Referring now to FIG. 2, circuit arrangement 100 illustrates an expanded implementation of UART chip 20 as per FIG. 1. UART chip 20 encompasses a parallel bus interface circuit 101 having a bus buffer 102, an operation control circuit 104 and an interrupt control circuit 106. Bus buffer 102 is responsive to operation control circuit 104 and allows read and write operations to occur between CPU 40 and UART chip 20. Operation control circuit 104 receives operation commands from the CPU and generates signals to internal sections of the UART to control UART operation. Interrupt control circuit 106 provides an interrupt upon an occurrence of a specific event, such as one of the previously-discussed, flow-control conditions.

In this example embodiment, UART chip 20 also includes a clock circuit 108, an input port 110, an output port 112, a serial communication circuit 114, a data storage register circuit 116 and an internal data bus 118. Clock circuit 108 is the timing source within the UART and typically includes a crystal oscillator, a baud rate generator and a set of clock selectors. In this example embodiment, clock circuit 108 has two clock inputs CLK1 and CLK2, with the CLK2 signal provided by clock circuit 50 and the CLK1 signal provided by the output of clock control circuit 60. Input and output ports 110 and 112, respectively, are general-purpose input and output ports that can be enabled by various registers, as well as other communicative blocks coupled to the internal data bus 118.

In this example embodiment, serial communication circuit 114 receives serial data 14 from modem 12 at the second clock rate (TL2) and converts the serial data into a parallel format that is processed by CPU 40. Serial data communication generally operates at a selected clock rate (i.e., operating frequency) that is independent from the baud rate generator or any counter/timers. The data-storage-register circuit 116 functions at a clock rate that is independent of serial communication circuit 114 and indicates the operating state of at least one serial communication circuit 114 and parallel bus interface circuit 101.

In this example embodiment, clock circuit 108 clocks bus interface circuit 101, ports 110 and 112 and data storage register circuit 116 at clock rate TL1 from CLK1 and clocks serial communication circuit 114 at clock rate TL2 from CLK2. In response to the first clock signal at CLK1, bus interface circuit 101 passes data between parallel bus 30 and serial communication circuit 114 via internal data bus 118. Concurrently, data-storage-register circuit 116 communicates status information to parallel data bus 30, indicating the operating state of at least one of the serial communication and bus interface circuits. By using register circuit 116, CPU 40 receives regular updates on the data flow between the serial communication circuit and the bus interface circuit. Register circuit 116 indicates overflow or underflow conditions. Depending on the flow conditions, CPU 40 can reduce or increase clocking rate TL1 "on the fly" to improve data flow or to prevent data loss. Irrespective of the changes in clock rate TL1 of CLK 1, the serial data rate remains constant because the clocking rate of TL2 at serial communication circuit 114 remains constant.

In an example embodiment, serial communication circuit 114 of UART chip 20 includes a first-in-first-out (FIFO) buffer adapted to store data passing between serial communication circuit 114 and bus interface circuit 101. In this example, data-storage-register circuit 116 provides the CPU data indicative of at least one flow condition for data passing through the FIFO. With such an arrangement, the CPU can use the flow condition data to make real time adjustments to the TL1 clocking rate (e.g., to avoid loss of serial data).

In another related embodiment, the first clock rate is reduced by CPU 40 to generate a third clock rate that is at least ten percent slower than the first clock rate. All of the UART components initially driven at the first clock rate are now driven at the third clock rate, effectively reducing the power consumption of the UART. In yet another related embodiment, the UART is configurable into an ultra-low-power operating mode by reducing the first clock rate to zero. This is advantageous because power is conserved in situations in which serial data traffic is slow, intermittent or has stopped altogether. In yet another embodiment, the UART is configurable to enhance data processing performance of the CPU by increasing the first clock rate to a rate that is higher than the second clock rate. This can be advantageous, for example to overcome an overflow condition caused by a loss of data because the CPU is not properly processing the serial data.

Any of the above embodiments can be implemented by modifying commercially-available UART devices to include the above-described operation. For further details on such commercially-available components and their modes of operation, reference may be made to Product Specifications, No. 853-1585-23061 (Jan. 31, 2000) and No. 853-1078-19971 (Sep. 4, 1998), for UART part numbers SCC2691AC1A28 and SC26C92A1A UART part numbers; each being commercially available from Philips Semiconductor and incorporated herein by reference.

Accordingly, the present invention achieves UART clock control without first terminating all serial communication with the digital device. While the present invention has been described with reference to several particular example embodiments, those skilled in the art will recognize that many changes may be made thereto without departing from the spirit and scope of the present invention, which is set forth in the following claims.

What is claimed is:

1. An arrangement of a plurality of integrated circuit devices including a first integrated circuit device driven by a first clock signal at a first clock rate, the arrangement comprising:

a parallel data bus coupled to communicate with the first integrated circuit device in response to the first clock signal;

a universal asynchronous receiver/transmitter (UART) chip including a serial communication circuit adapted to communicate serial data at a second rate defined by a second clock signal, a parallel bus interface circuit responsive to the first clock signal and adapted to pass data between the parallel data bus and the serial communication circuit, and a data-storage-register circuit adapted to output status data to the parallel data bus, the status data indicative of states of at least one of the serial communication circuit and the parallel bus interface circuit; and a clock control circuit adapted to reduce the first clock rate in response to a clock control signal and therein provide a power-reduced UART mode in which the serial communication circuit is adapted to continue communication of serial data at the second rate.

2. The arrangement of claim 1, wherein the clock control circuit is further adapted to reduce the first clock rate to zero.

3. The arrangement of claim 1, wherein the clock control circuit is further adapted to reduce the first clock rate to a third clock rate that is at least ten percent slower than the first clock rate.

4. The arrangement of claim 1, wherein the second clock rate is derived from the first clock rate.

5. The arrangement of claim 1, wherein the first clock rate and the second clock rate change states asynchronously.

6. The arrangement of claim 1, wherein the second clock rate is set to define serial communication with another of the plurality of integrated circuit devices.

7. The arrangement of claim 1, wherein the UART chip further includes a first-in-first-out (FIFO) buffer adapted to store data passing between the serial communication circuit and the parallel bus interface circuit.

8. The arrangement of claim 1, wherein the data-storage-register circuit is further adapted to provide data indicative of at least one flow condition for data passing between the parallel data bus and the serial communication circuit.

9. The arrangement of claim 8, wherein said at least one flow condition include an overflow condition and an underflow condition.

10. The arrangement of claim 1, wherein the UART chip further includes a first-in-first-out (FIFO) buffer adapted to store data passing between the serial communication circuit and the parallel bus interface circuit, and wherein the data-storage-register circuit is further adapted to provide data indicative of at least one flow condition for data passing through the FIFO.

* * * * *